(12) United States Patent
Billich (10) Patent No.: US 11,781,630 B2
(45) Date of Patent: Oct. 10, 2023

(54) POWER SPLIT TRANSMISSION, TRANSMISSION MODULE AND VEHICLE

(71) Applicant: DEERE & COMPANY, Moline, IL (US)

(72) Inventor: Manuel Billich, Dischingen (DE)

( * ) Notice: Subject to any disclaimer, the term of this patent is extended or adjusted under 35 U.S.C. 154(b) by 214 days.

(21) Appl. No.: 17/117,190

(22) Filed: Dec. 10, 2020

(65) Prior Publication Data

US 2021/0222761 A1    Jul. 22, 2021

(30) Foreign Application Priority Data

Jan. 16, 2020   (DE) .......................... 102020200509.5

(51) Int. Cl.
*F16H 37/08*    (2006.01)
*F16H 47/04*    (2006.01)

(52) U.S. Cl.
CPC ........... *F16H 37/084* (2013.01); *F16H 47/04* (2013.01); *F16H 2037/0886* (2013.01); *F16H 2200/201* (2013.01); *F16H 2200/2038* (2013.01)

(58) Field of Classification Search
CPC ............. F16H 37/084; F16H 2037/088; F16H 2037/0886; F16H 47/04; F16H 2200/201; F16H 2200/2038
See application file for complete search history.

(56) References Cited

U.S. PATENT DOCUMENTS

2018/0043764 A1*   2/2018   McKinzie .............. B60K 6/543

FOREIGN PATENT DOCUMENTS

| DE | 102012216781 A1 | 3/2013 |
| DE | 102018212712 A1 | 1/2019 |
| EP | 0137264 A1 | 4/1985 |
| SU | 1209974 A1 | 2/1986 |

OTHER PUBLICATIONS

European Search Report issued in European Patent Application No. 20213416.9, dated Jul. 21, 2021, 9 pages.

* cited by examiner

*Primary Examiner* — Erin D Bishop
(74) *Attorney, Agent, or Firm* — Tucker Ellis LLP; Evan R. Sotiriou (57) ABSTRACT

A power split transmission for a work vehicle includes at least one drivable transmission input shaft, a power distribution module, a rotational speed variator having a variator output shaft, a transmission module operatively connected both to the transmission input shaft and the variator output shaft, and a transmission output shaft. The transmission module includes at least two transmission auxiliary shafts each of which includes at least one summation transmission for combining power introduced via the transmission input shaft and the variator output shaft. The transmission module includes at least one power shift stage via which the transmission auxiliary shafts are selectively connected to the transmission output shaft. A continuously variable transmission ratio is produced between the transmission input shaft and transmission output shaft.

18 Claims, 6 Drawing Sheets

POWER SPLIT TRANSMISSION, TRANSMISSION MODULE AND VEHICLE

RELATED APPLICATIONS

This application claims priority to German Application No. 102020200509.5, filed Jan. 16, 2020, the disclosure of which is hereby expressly incorporated by reference in its entirety.

FIELD OF THE DISCLOSURE

The present disclosure relates to a power split transmission for a vehicle, in particular an agricultural or industrial utility vehicle, with a continuously variable transmission ratio and at least one drivable transmission input shaft, a power distribution module, a rotational speed variator with a variator output shaft, a transmission module actively connected both to the transmission input shaft and the variator output shaft and a transmission output shaft.

BACKGROUND

Continuously variable transmissions are known. They are used, for example, on vehicles such as a utility vehicle used in agriculture, industry and construction. For example, ZF Friedrichshafen AG thus shows under the designation ECCOM® an input-coupled, hydrostatic-mechanical power split transmission which has, among other things, a hydrostat or continuously variable rotational speed variator, a transmission module for combining power with a downstream power shift transmission and a reversing unit. The conveying volume of the hydraulic pump of the rotational speed variator can be adjusted by a change in the actuation flows between a positive and a negative maximum value. Such a transmission has no tractive force interruption and no noticeable shifting of the power shift gears over the complete gear ratio since a shift is made between two gears at what are known as synchronous points in the case of the same rotational speed. The power dimensioning of the continuously variable rotational speed variator can generally be smaller than the transmission input power. The transmission described above is complex and has, in order to realize four power shift stages, five shift elements (four clutches and a brake) as well as four interconnected planetary stages.

There is a need for an improved power split transmission capable of overcoming the disadvantages of conventional power split transmissions.

SUMMARY

According to the present disclosure, a power split transmission with a continuously variable transmission ratio for a vehicle has at least one drivable transmission input shaft, a power distribution module, a rotational speed variator with a variator output shaft, a transmission module actively connected both to the transmission input shaft and the variator output shaft and a transmission output shaft. The transmission module has at least two transmission auxiliary shafts with in each case at least one summation transmission for combining the power introduced in each case via the transmission input shaft and the variator output shaft and at least one power shift stage, via which the transmission auxiliary shafts can be connected selectively to the transmission output shaft. The power split transmission or, in particular the transmission module, can be realized in this manner by simple and where possible a large number of transmission elements of the same type and furthermore can be embodied with as few as possible shifting elements. A compact design can furthermore be achieved. The advantages of the prior art can also be maintained. The vehicle is in particular an agricultural or industrial utility vehicle, such as a type of an agricultural tractor or tractor. The vehicle can, however, also be an agricultural harvesting machine, a self-propelled sprayer, a construction vehicle, a transport/towing vehicle or any other suitable vehicle, in particular of the type of a commercial vehicle.

The power split transmission can be formed, for example, to be hydraulic-mechanical or electro-mechanical. A hydraulic-mechanical power split transmission can have a rotational speed variator with a hydraulic first pump unit with an adjustable volume and a second pump unit having a constant volume, wherein the first pump unit can advantageously be adjustable between a maximum negative deflection and a maximum positive deflection. In the case of an electro-mechanical power split transmission, the rotational speed variator can be realized, for example, by one or more electric motors.

It is particularly simple in terms of structure if at least one of the transmission auxiliary shafts has at least two and at least a second or further transmission auxiliary shaft has at least one summation transmission, wherein each summation transmission is assigned at least one power shift stage. Three gears or transmission ratios can easily be realized in this manner. The transmission module can, however, also be expanded by further gears, for example, to increase the overall gear ratio or reduce the power dimensioning of the continuously variable rotational speed variator by virtue of the fact that a further power shift stage is additionally added in alternation with the transmission auxiliary shafts.

At least one of the transmission auxiliary shafts is formed in the manner of a shaft assembly or has two or more auxiliary shaft portions. In this manner, the shaft assembly or the two or more auxiliary shaft portions can be connected, for example, by transmission elements such as one or more clutch elements, summation transmissions, or the like, in particular selectively or in a transmitted manner. For example, the at least one transmission auxiliary shaft, for the realization of three gears/transmission ratios, can be formed in three parts or have three auxiliary shaft portions.

At least one, but in at least one embodiment all of the summation transmissions, have a sun gear, at least one planetary gear set with a connecting web and an internal gear, wherein the sun gear is actively connected to the variator output shaft or the internal gear is actively connected to the transmission input shaft or the planetary gear set or the web is actively connected to the power shift stage. It is, however, also conceivable that the input shaft is actively connected via the web or the sun gear to the summation transmission and output drive is correspondingly performed via internal gear/sun or web/internal gear. If at least two of the summation transmissions are formed to be at least substantially identical, the number of different components can be reduced as a result of this. It is, however, also conceivable to form several or all of the summation transmissions to be at least substantially identical in order to further reduce the complexity of the system.

In order to produce an active link between the transmission input shaft and the transmission output shaft, the transmission input shaft can have at least one auxiliary shaft drive gearwheel which is actively connected to one of the summation transmissions, or at least one of the transmission auxiliary shafts bears at least one output gearwheel which meshes with at least one output gearwheel arranged in a rotationally conjoint manner on the transmission output shaft.

A particularly simple structure can be realized if the link between the transmission input shaft and one of the summation transmissions of the first transmission auxiliary shaft as well as between the transmission input shaft and the summation transmission of the second transmission auxiliary shaft have an identical transmission ratio or the link between the transmission input shaft and the summation transmissions of the first transmission auxiliary shaft have a different transmission ratio.

If the transmission input shaft, the transmission output shaft and the transmission auxiliary shafts are arranged in a kite shape or the axial distances between the transmission input shaft and the transmission auxiliary shafts and the transmission auxiliary shafts and the transmission output shaft are identical, as small as possible a design with a small distance between the transmission input shaft and the transmission output shaft can be realized.

A transmission module for a power split transmission has at least two transmission auxiliary shafts with in each case at least one summation transmission for combining the power introduced in each case via the transmission input shaft and the variator output shaft and at least one power shift stage, via which the transmission auxiliary shafts can be connected selectively to the transmission output shaft. This type of transmission module can reduce the complexity of the power split transmission and therefore enable a saving in installation space or cost. Moreover, the transmission module can replace a known transmission module of a power split transmission in a simple manner.

It is advantageous if a vehicle has at least one power split transmission described above. In this manner, for example, the complexity of the vehicle can be reduced, installation space saved or used in another manner or the vehicle can be produced at low cost. The vehicle is in particular an agricultural or industrial utility vehicle, such as the type of an agricultural tractor or a tractor. The vehicle can, however, also be an agricultural harvesting machine, a self-propelled sprayer, a construction vehicle, a transport/towing vehicle or any other suitable vehicle, in particular commercial vehicle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
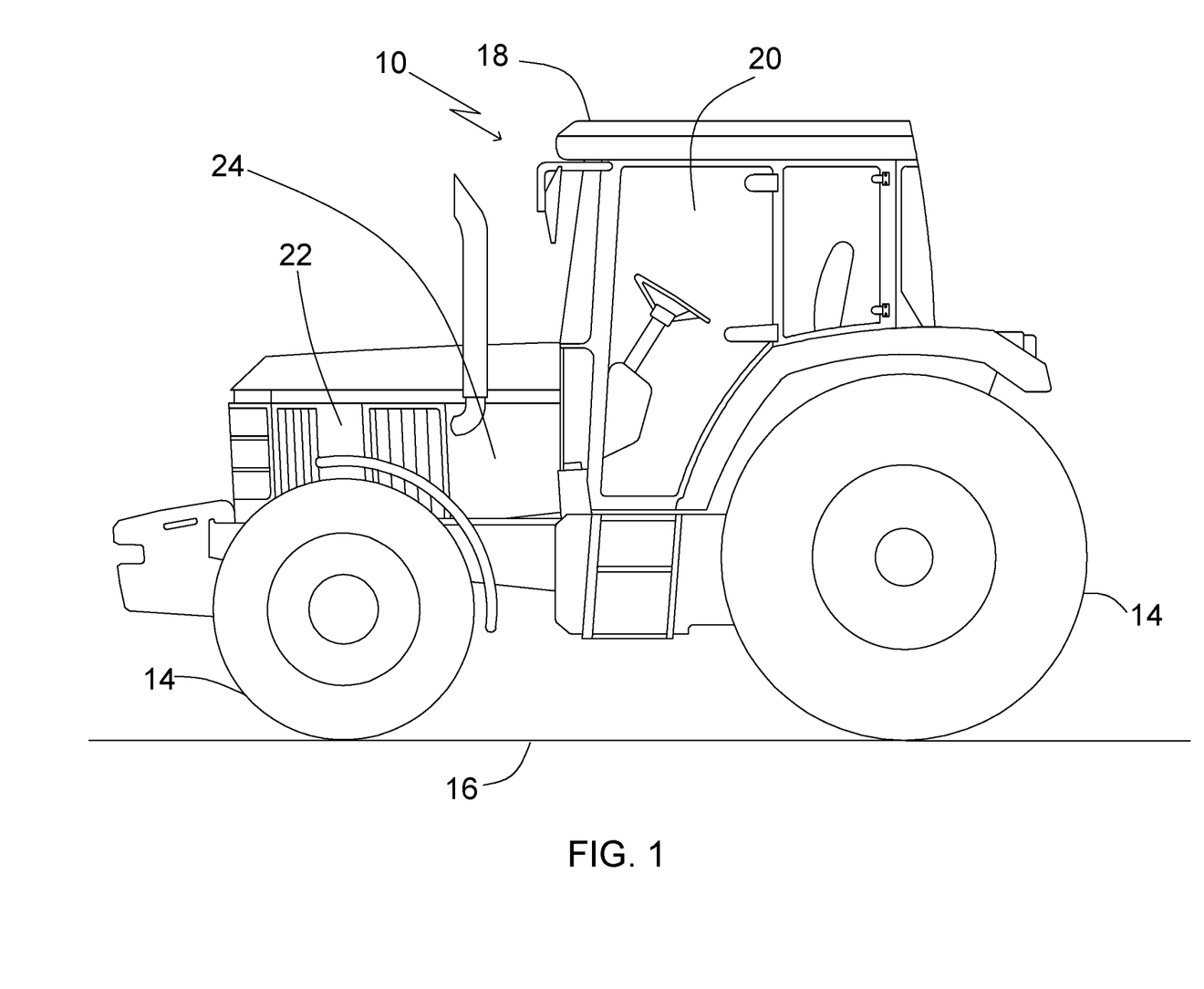
FIG. 1 is a side view of an agricultural vehicle with a drive and a power split transmission.

FIG. 1 of the drawing shows an agricultural vehicle 10 such as a type of an agricultural tractor which is supported on a ground surface 16 via front and rear wheels 14. An operator workplace 20 is arranged in a cabin 18. The vehicle 10 has a drive 22 and a power split transmission 24 which is discussed in greater detail below.

Figure 2:
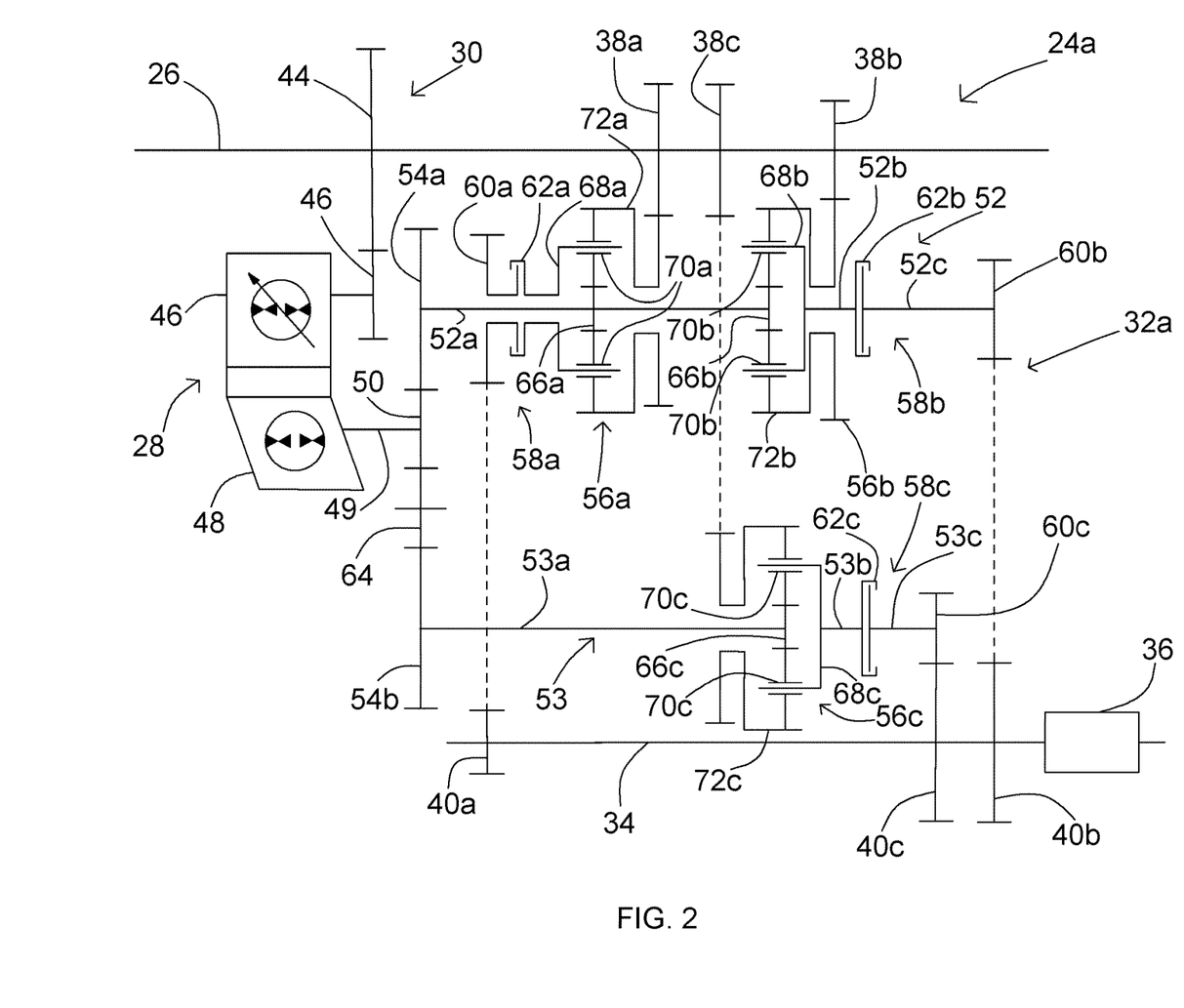
FIG. 2 shows a first embodiment of a power split transmission.

According to the first embodiment shown in FIG. 2, a power split transmission 24a has a transmission input shaft 26, a rotational speed variator 28, which in the embodiment shown is formed in the manner of a hydrostat unit, a power distribution module 30 (which in one or more embodiments includes the rotational speed variator 28), a transmission module 32a, a transmission output shaft 34 and a reversing module 36 only represented in an outline. Reversing module 36, which can be actively connected to transmission output shaft 34, is known and can alternatively also be provided on transmission input shaft 26 downstream of power distribution module 30. It should be pointed out that rotational speed variator 28 can alternatively be formed to be electric and can be realized, for example, by one or more or a combination of electric motor(s).

A first, a second and a third auxiliary shaft drive gearwheel 38a, b, c are provided in a rotationally conjoint manner on transmission input shaft 26, and a first, a second and a third output drive gearwheel 40a b, c are provided, likewise in a rotationally conjoint manner, on transmission output shaft 34.

Drive 22, which can be formed in a known manner, for example, as an internal combustion engine or in any other suitable manner, outputs torque to transmission input shaft 26. This drives a gearwheel 42 which meshes with an input gearwheel 44 of a hydraulic first pump unit 46, with an adjustable volume, of rotational speed variator 28. First pump unit 46 is hydraulically connected to a second pump unit 48, having a constant volume, of rotational speed variator 28. Second pump unit 48 of rotational speed variator 28 drives a variator output gearwheel 50 via a variator output shaft 49. First pump unit 46 can be adjusted between a maximum negative deflection and a maximum positive deflection.

Transmission module 32a has a first and a second shaft assembly which are referred to below for the purpose of simplification as first and second transmission auxiliary shaft 52, 53 and which have in each case auxiliary shaft portions 52a, b, c, or 53a, b, c. There are arranged on first transmission auxiliary shaft 52, according to the first embodiment of the disclosure, a first variator input gearwheel 54a, a first and a second summation transmission 56a, 56b with respectively assigned first and second power shift stages 58a, 58b and rotatably a first and a second auxiliary shaft output gearwheel 60a, b, and on second transmission auxiliary shaft 53 a second variator input gearwheel 54b, a single summation transmission 56c with an assigned power shift stage 58c and rotatably a third auxiliary shaft output gearwheel 60c. Power shift stages 58a, b, c, have in each case a clutch element 62a, b, c via which auxiliary shaft output gearwheels 60a, b, c can be selectively connected in a rotationally conjoint manner to respective transmission auxiliary shaft 52, 53. Auxiliary shaft output gearwheels 60a, b, c mesh with output gearwheels 40a, b, c arranged on transmission output shaft 34.

First variator input gearwheel 54*a* meshes directly with variator output gearwheel 50. An intermediate gearwheel 64 which meshes with variator input gearwheel 54*b* and variator output gearwheel 50 is provided between second variator input gearwheel 54*b* and variator output gearwheel 50, as a result of which first transmission auxiliary shaft 52 and second transmission auxiliary shaft 53 rotate in opposite directions when they are caused to rotate by variator output gearwheel 50.

The three summation transmissions 56*a, b, c* are formed to be at least substantially identical, summation transmissions 56*a, b, c* according to the embodiment shown having in each case in a familiar manner a sun gear 66*a, b, c*, several planetary gears 70*a, b, c* connected via a rotating web 68*a, b, c* and an internal gear 72*a, b, c*.

First auxiliary shaft portion 52*a* of first transmission auxiliary shaft 52 connects first variator input gearwheel 54*a* to first sun gear 66*a* of first summation transmission 56*a* and second sun gear 66*b* of second summation transmission 56*b*, second auxiliary shaft portion 52*b* web 68*b* of second summation transmission 56*b* to second clutch element 62*b* and third auxiliary shaft portion 52*c* clutch element 62*b* to second auxiliary shaft output gearwheel 60*b*. First auxiliary shaft portion 53*a* of transmission auxiliary shaft 53 connects second variator input gearwheel 54*b* to sun gear 66*c* of third summation transmission 56*c*, second auxiliary shaft portion 53*b*, web 68*c* to third clutch element 58*c* and third auxiliary shaft portion 53*c* clutch element 58*c* to third auxiliary shaft output gearwheel 60*c*.

First, second and third auxiliary shaft drive gearwheel 38*a, b, c* of transmission input shaft 26 are actively connected in each case to corresponding internal gear 72*a, b, c* of respective summation transmission 56*a, b, c*, the link between transmission input shaft 26 and internal gears 72*a, c* being formed to be identical in terms of the transmission ratio. The rotational speed transmission-fixed link between transmission input shaft 26 and second internal gear 72*b* has a higher transmission ratio than the link between first transmission input shaft 26 and first and third internal gear 72*a, c* in order to be able to exploit rotational speed variator 28 as uniformly as possible over the complete gear ratio range.

The rotational speed transmission-fixed connection between transmission auxiliary shafts 52, 53 and transmission output shaft 34 is performed via webs 68*a, b, c* which can be connected via respective clutch elements 62*a, b, c* to auxiliary shaft output gearwheels 60*a, b, c*. It is provided that always only one of the clutch elements 62*a, b, c* may be closed. The number of coupling elements 62*a, b, c* corresponds here to the number of load-shiftable transmission ratios of transmission module 32. According to the first embodiment shown in FIG. 2, these are three transmission ratios.

Figure 3:
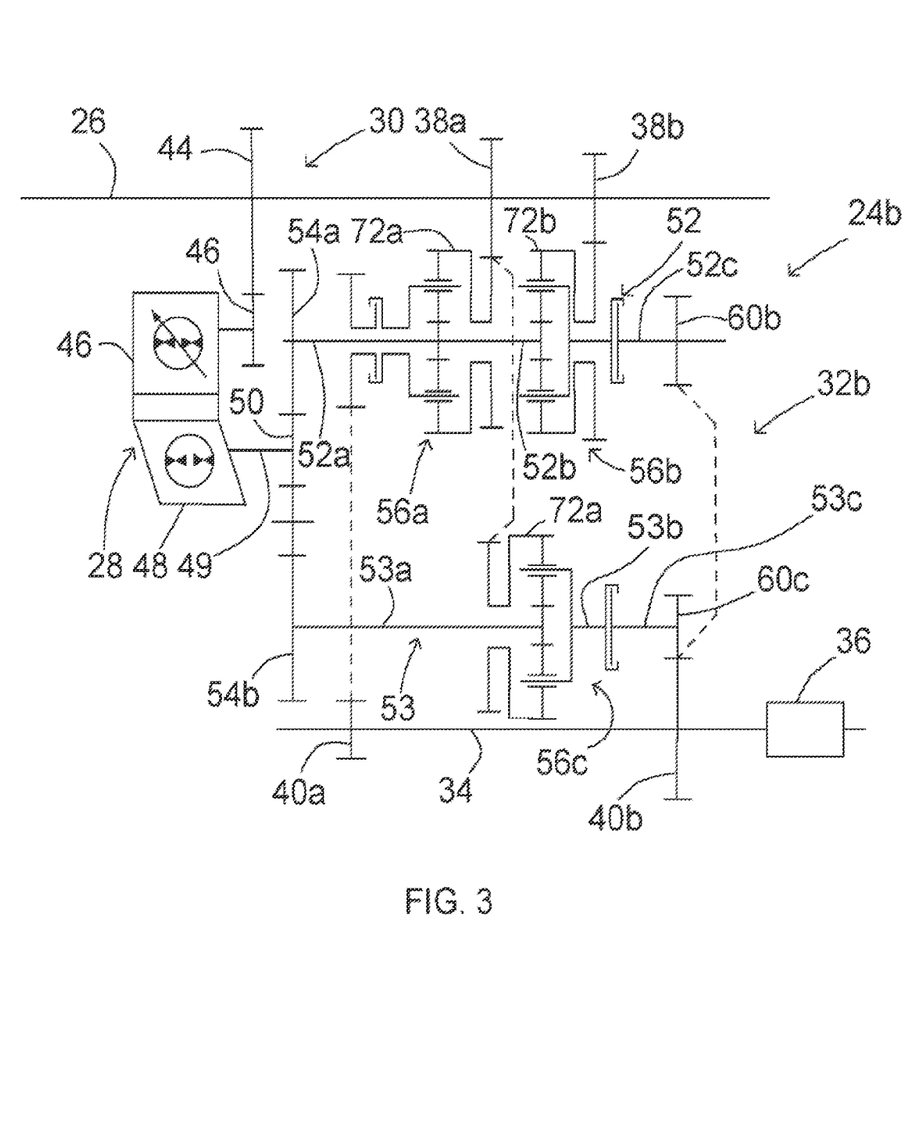
FIG. 3 shows a second embodiment of a power split transmission.
Figure 3A:
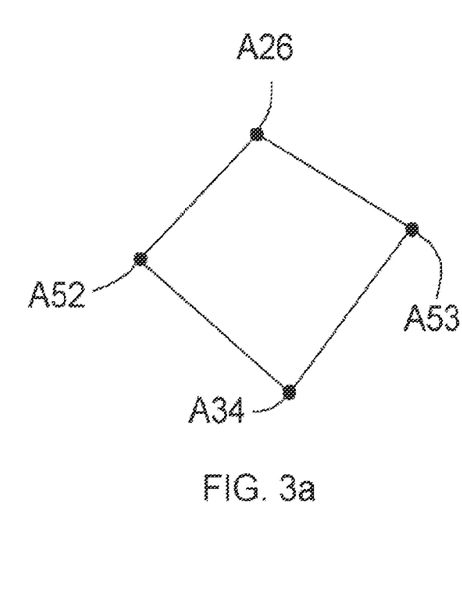
FIG. 3a shows a simplified representation of the arrangement of a transmission input shaft, a transmission output shaft and two transmission auxiliary shafts of the power split transmission from FIG. 3, FIGS. 4a to 4c show a fourth, fifth and sixth embodiment of a power split transmission.

The embodiment shown in FIG. 3 corresponds in its mode of operation to the embodiment according to FIG. 2. Nevertheless, transmission input shaft 26, transmission output shaft 34 and transmission auxiliary shafts 52, 53 are arranged in a kite shape, i.e., transmission input shaft 26 or its axis A26 and transmission output shaft 34 or its axis A34 are in each case evenly spaced apart from transmission auxiliary shafts 52, 53 or their axes A52, A53, as is represented schematically in FIG. 3*a*. As a result of this kite arrangement, in the case of provision of an identical transmission ratio and the same spacing of transmission auxiliary shafts 52, 53 in relation to transmission input shaft 26, first auxiliary shaft drive gearwheel 38*a* can be actively connected both to first summation transmission 56*a* of first transmission auxiliary shaft 52 and third summation transmission 56*c* of second transmission auxiliary shaft 53. Likewise, in the case of a correspondingly identical transmission ratio and the same spacing of transmission auxiliary shafts 52, 53 in relation to transmission output shaft 34, both one of auxiliary shaft output gearwheels 60*b* of first transmission auxiliary shaft 52 and auxiliary shaft output gearwheel 60*c* of second transmission shaft 53 mesh with a joint output drive gearwheel 40*b* of transmission output shaft 34.

Figure 4A:
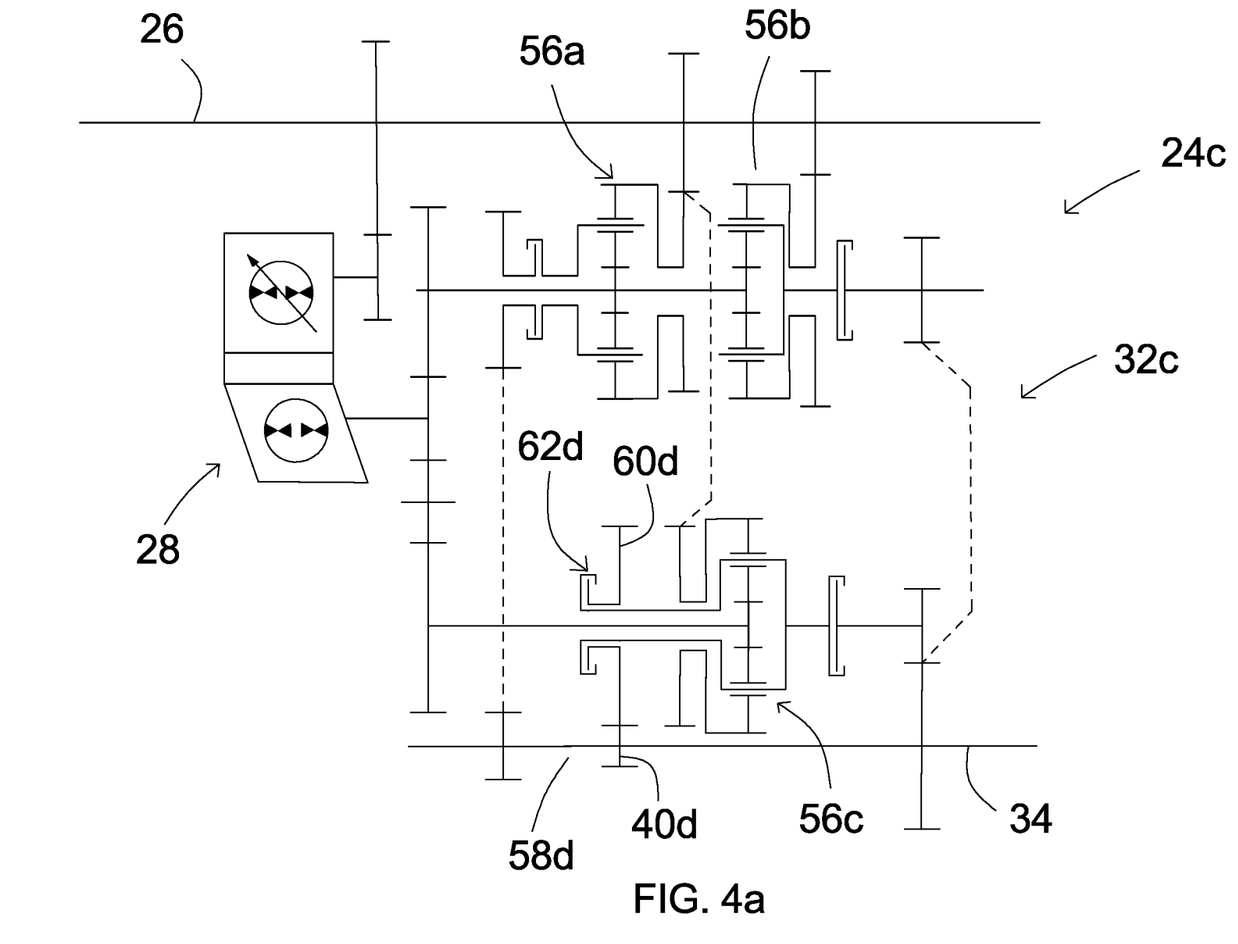

Reference is now also made to FIGS. 4*a, b* and *c*, in which further embodiments of the disclosure are shown. In terms of their basic structure, all of the three embodiments correspond to power split transmission 24*b* represented in FIGS. 3 and 3*a*, which is why only components cited in the description are provided with reference numbers in the figures. In the case of the two embodiments shown above, transmission module 32*a, b* has three power-shiftable gears/transmission ratios. According to embodiments 3-5, in each case one, two or three additional power shift stages 58*d, e, f* are provided. Each of power shift stages 58*d, e, f* has an additional clutch element 62*d, e, f* which can selectively connect in each case one of summation transmissions 56*a, b, c* to a further auxiliary shaft output gearwheel 60*d, e, f* which meshes with an additional output drive gearwheel 40*d, e, f* provided in a rotationally conjoint manner on output drive shaft 34.

Figure 4B:
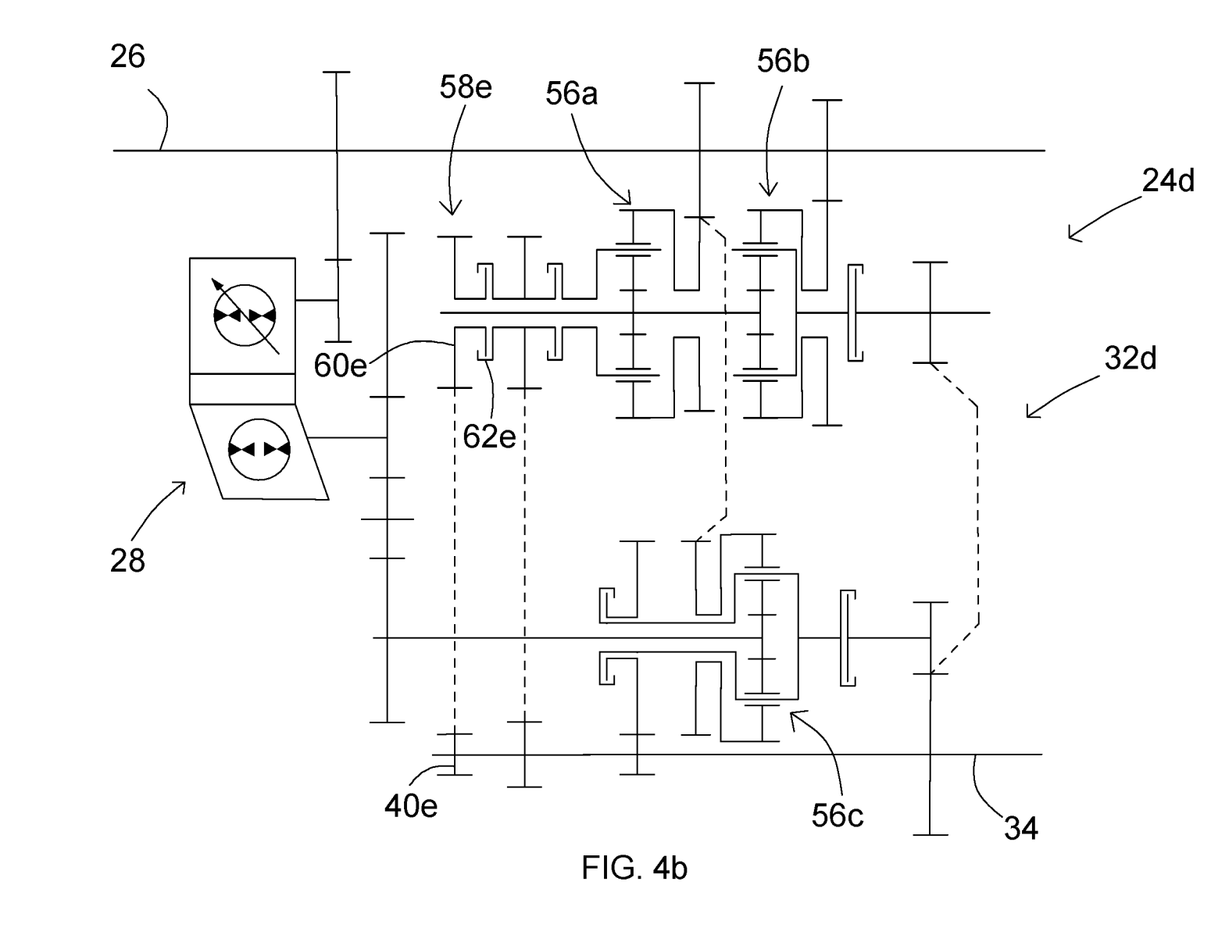
Figure 4C:
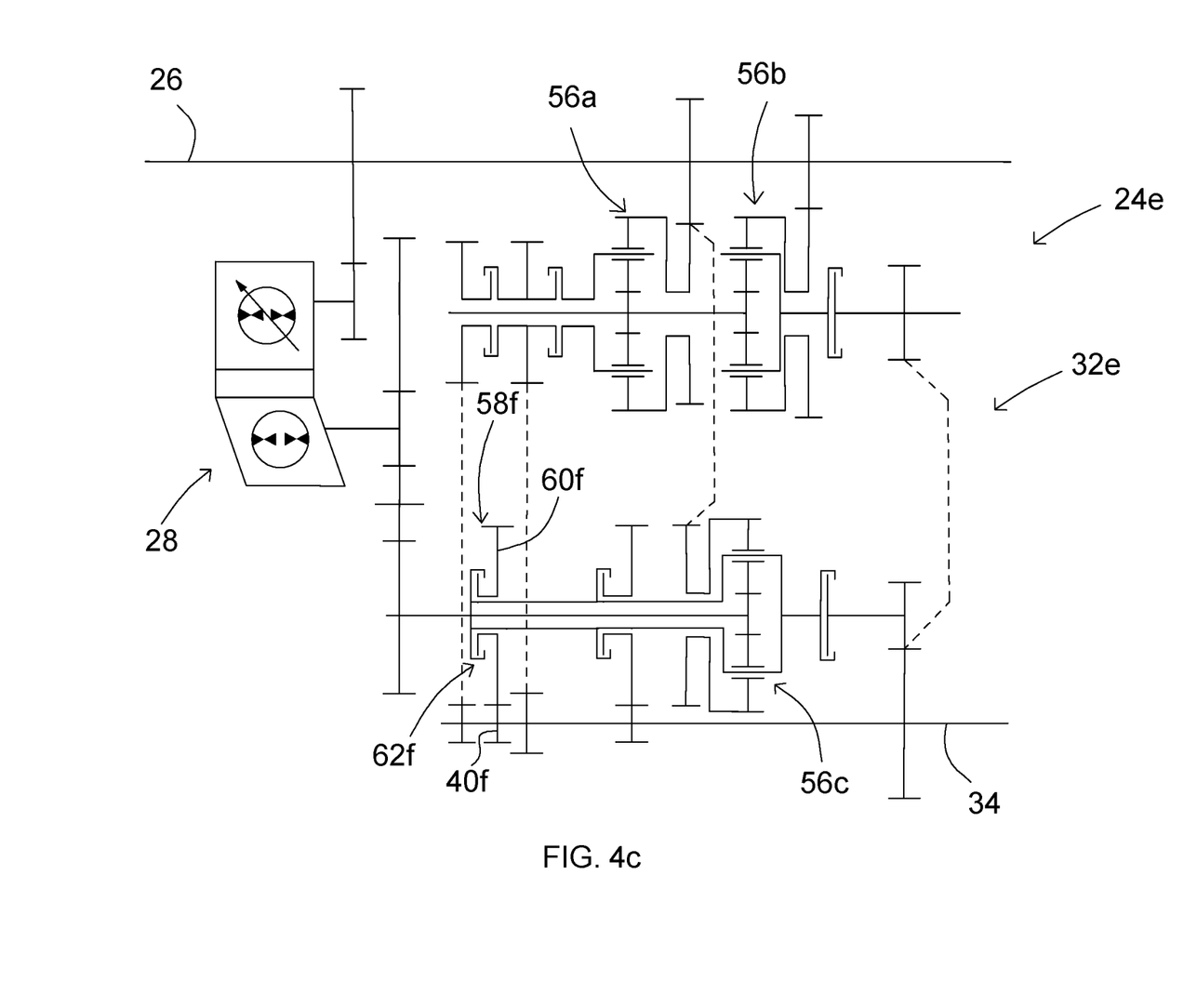

By virtue of the fact that, in alternation with transmission auxiliary shafts 52, 53, a transmission stage which can be coupled via an in particular power-shiftable clutch element 62*d, e, f* is additionally added, further gears can easily be provided, as a result of which the overall gear ratio is increased or the power dimensioning of continuously variable rotational speed variator 28 is reduced. Even if power split transmissions 24*c, d, e* shown in FIGS. 4*a-c* are fundamentally formed according to the embodiment according to FIG. 3, it is also alternatively conceivable to form the shown power split transmissions in accordance with the representation and corresponding description according to FIG. 2.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A power split transmission for a work vehicle, comprising:
   at least one drivable transmission input shaft;
   a power distribution module including a rotational speed variator having a variator output shaft;
   a transmission module operatively connected both to the transmission input shaft and the variator output shaft; and
   a transmission output shaft;
   wherein the transmission module comprises at least first and second transmission auxiliary shafts, the second transmission auxiliary shaft including at least one summation transmission and the first transmission auxiliary shaft including at least two summation transmissions, for combining power introduced via the transmission input shaft and the variator output shaft;
   wherein the transmission module comprises power shift stages via which the transmission auxiliary shafts are selectively connected to the transmission output shaft;
   wherein a continuously variable transmission ratio is produced between the transmission input shaft and transmission output shaft.

2. The power split transmission of claim 1, wherein the power split transmission is formed to be hydraulic-mechanical or electro-mechanical.

3. The power split transmission of claim 1, wherein one of the first or second transmission auxiliary shafts includes a further transmission auxiliary shaft portion which forms part of at least one summation transmission.

4. The power split transmission of claim 3, wherein each summation transmission is assigned at least one power shift stage.

5. The power split transmission of claim 1, wherein at least one of the transmission auxiliary shafts is formed as a shaft assembly or comprises two or more auxiliary shaft portions.

6. The power split transmission of claim 1, wherein at least one of the summation transmissions comprises a sun gear, at least one planetary gear set with a connecting web, and an internal gear.

7. The power split transmission of claim 6, wherein:
the sun gear is actively connected to the variator output shaft, the internal gear is actively connected to the transmission input shaft, or the planetary gear set or the web is actively connected to the power shift stage.

8. The power split transmission of claim 7, wherein at least two of the summation transmissions are formed to be at least substantially identical.

9. The power split transmission of claim 1, wherein the transmission input shaft comprises at least one auxiliary shaft drive gearwheel which is actively connected to one of the summation transmissions.

10. The power split transmission of claim 9, wherein at least one of the transmission auxiliary shafts bears at least one output gearwheel which meshes with at least one output gearwheel arranged in a rotationally conjoint manner on the transmission output shaft.

11. The power split transmission of claim 1, wherein a first link between the transmission input shaft and at least one of the at least two summation transmissions of the first transmission auxiliary shaft and a second link between the transmission input shaft and the at least one summation transmission of the second transmission auxiliary shaft have an identical transmission ratio.

12. The power split transmission of claim 1, wherein respective links between the transmission input shaft and each of the summation transmissions of the first transmission auxiliary shaft have a different transmission ratio.

13. The power split transmission of claim 1, wherein the transmission input shaft, the transmission output shaft and the transmission auxiliary shafts are arranged in a kite shape.

14. The power split transmission of claim 13, wherein the distances between the transmission input shaft and the transmission auxiliary shafts and the transmission auxiliary shafts and the transmission output shaft are identical.

15. A power split transmission, comprising:
at least one drivable transmission input shaft;
a power distribution module including a rotational speed variator having a variator output shaft;
a transmission module operatively connected both to the transmission input shaft and the variator output shaft; and
a transmission output shaft;
wherein the transmission module comprises at least two transmission auxiliary shafts, one of the at least two transmission auxiliary shafts including at least one summation transmission for combining power introduced via the transmission input shaft and the variator output shaft and another one of the at least two transmission auxiliary shafts including at least two summation transmissions;
wherein the transmission module comprises power shift stages via which the transmission auxiliary shafts are selectively connected to the transmission output shaft;
wherein a continuously variable transmission ratio is produced between the transmission input shaft and transmission output shaft,
wherein at least two transmission auxiliary shafts wherein the at least two transmission auxiliary shafts and at least one of the power shift stages and at least one power shift stage can be selectively connected to the transmission output shaft.

16. The transmission module of claim 15, wherein one of the at least two transmission auxiliary shafts includes a further transmission auxiliary shaft portion which forms part of at least one summation transmission.

17. The transmission module of claim 16, wherein each summation transmission is assigned at least one power shift stage.

18. An agricultural vehicle, comprising:
a plurality of wheels;
a cabin including an operator workplace;
a drive for generating torque; and
a power split transmission coupled to the drive, the power split transmission comprising:
a transmission input shaft operably connected to the drive for receiving the torque;
a power distribution module including a rotational speed variator having a variator output shaft;
a transmission module operatively connected both to the transmission input shaft and the variator output shaft; and
a transmission output shaft;
wherein the transmission module comprises at least two transmission auxiliary shafts, one of the at least two transmission auxiliary shafts including at least one summation transmission and another one of the at least two transmission auxiliary shafts including at least two summation transmissions, for combining power introduced via the transmission input shaft and the variator output shaft;
wherein the transmission module comprises power shift stages via which the transmission auxiliary shafts are selectively connected to the transmission output shaft; and
wherein a continuously variable transmission ratio is produced between the transmission input shaft and transmission output shaft.

* * * * *